US012710637B2

(12) United States Patent
Lee et al.

(10) Patent No.: US 12,710,637 B2
(45) Date of Patent: Aug. 18, 2026

(54) DEVICE FOR ADJUSTING MICROSCOPE IN THREE-AXIS DIRECTION

(71) Applicant: Southern Taiwan University of Science and Technology, Tainan (TW)

(72) Inventors: Tsung-Lu Michael Lee, Tainan (TW); Kun-Hsing Yu, Tainan (TW)

(73) Assignee: Southern Taiwan University of Science and Technology, Tainan (TW)

( * ) Notice: Subject to any disclaimer, the term of this patent is extended or adjusted under 35 U.S.C. 154(b) by 262 days.

(21) Appl. No.: 18/624,227

(22) Filed: Apr. 2, 2024

(65) Prior Publication Data

US 2025/0164772 A1 May 22, 2025

(30) Foreign Application Priority Data

Nov. 22, 2023 (TW) ................................ 112145223

(51) Int. Cl.

*G02B 21/26* (2006.01)
*G02B 21/24* (2006.01)
*G02B 21/34* (2006.01)
*G02B 21/36* (2006.01)

(52) U.S. Cl.

CPC ........... *G02B 21/26* (2013.01); *G02B 21/244* (2013.01); *G02B 21/34* (2013.01); *G02B 21/361* (2013.01)

(58) Field of Classification Search

CPC ...................................................... G02B 21/26
See application file for complete search history.

(56) References Cited

U.S. PATENT DOCUMENTS

2018/0267288 A1* 9/2018 Sakamoto .............. G02B 21/34

* cited by examiner

*Primary Examiner* — Edmond C Lau

(74) *Attorney, Agent, or Firm* — Troutman Pepper Locke LLP; Tim Tingkang Xia, Esq.

(57) ABSTRACT

The present disclosure provides a device for adjusting microscope in three-axis direction, comprising: a first gear set, which is matched with a first rotating part of a rotation unit of a microscope, and is configured to move a microscope stage along an x-axis direction; a second gear set, which is matched with a second rotating part of the rotation unit of the microscope, and is configured to move a slide holder along a y-axis direction relative to the microscope stage; a collet, which is mounted on a focus knob, and is able to drive the focus knob rotate and move the microscope stage along a z-axis direction; and a processor, electronically connected with the first gear set, the second gear set, and the collet, and is configured to control operation of the first gear set, the second gear set and the collet optionally.

14 Claims, 6 Drawing Sheets

DEVICE FOR ADJUSTING MICROSCOPE IN THREE-AXIS DIRECTION

CROSS REFERENCE TO RELATED APPLICATION

This application claims the benefit of Taiwan Patent Application Ser. No. 112145223, filed Nov. 22, 2023.

FIELD OF THIS INVENTION

The present disclosure generally relates to control device, and more specifically to a control device of controlling a stage and a slide holder of a microscope to move along three-axis direction.

BACKGROUND

A microscope is an apparatus for people to observe tiny objects that can't be seen by naked human eye, wherein a rotation unit is used for controlling movement of a microscope stage and a slide thereon along a x-y-plane direction, allows the slide to move to proper location and then objects under the slide could be observed properly. In fact, it will be necessary to move a slide holder or the microscope stage by operating the rotation unit or a focus knob for obtaining complete image of object under a slide, for instance, when surface of slide is uneven, or when taking pictures in a row. However, in some cases, manual adjustment of such as the focus knob is imprecise, and is ineffective for continually images harvest, people need to retry a couple times to focus on the objects under the slide without any help.

THE SUMMARY OF INVENTION

One of purposes of the present disclosure is providing a device, which can precisely control the direction or distance of moving of a microscope stage with a slide, and the device can be easily mounted on a common microscope.

To achieve the purpose, the present disclosure provides a device for adjusting microscope in three-axis direction, comprising: a first gear set, which is matched with a first rotating part of a rotation unit of a microscope, and is configured to move a microscope stage along an x-axis direction; a second gear set, which is matched with a second rotating part of the rotation unit of the microscope, and is configured to move a slide holder along a y-axis direction relative to the microscope stage; a collet, which is mounted on a focus knob, and is able to drive the focus knob rotate and move the microscope stage along a z-axis direction; and a processor, electronically connected with the first gear set, the second gear set, and the collet, and is configured to control operation of the first gear set, the second gear set and the collet optionally.

Preferably, the first gear set comprises: a first gear, which is rotatable; and a second gear, which is rotatable and is correspondingly arranged with the first gear; and the second gear set comprises: a third gear, which is rotatable; and a fourth gear, which is rotatable and is correspondingly arranged with the third gear. a first bore hole is coaxially arranged on the second gear, and that allows the second gear to detachably mount on the first rotating part; a second bore hole is coaxially arranged on the fourth gear, and that allows the fourth gear to detachably mount on the second rotating part; wherein when the first gear rotates, the second gear and the first rotating part rotate cooperatively, and when the third gear rotates, the fourth gear and the second rotating part rotate cooperatively.

Preferably, wherein the second gear is coaxial to the fourth gear, and the second gear is arranged above the fourth gear, wherein further comprises a rotating shaft, which is arranged between the second gear and the fourth gear.

Preferably, the device further comprises a first main body, which is comprising: a first storage space arranged inside the first main body; and there third bore hole, which are separately disposed on same side of the first main body and are connected to the first storage space; and a second main body, which is comprising: a second storage space, arranged inside the second main body, and a fourth bore hole, which is disposed on side of the second main body and is connected to the second storage space.

Preferably, the device further comprises a motor set, which is electronically connected with the processor, being activated or deactivated by the processor optionally, wherein the motor set comprises: a first motor, which is correspondingly arranged with the first gear for optionally driving the first gear to rotate; a second motor, which is correspondingly arranged with the third gear for optionally driving the third gear to rotate; a third motor, which is correspondingly arranged with the collet for optionally driving the collet to rotate; wherein the first motor and the second motor are separately mounted in the first storage space, and the third motor is mounted in the second storage space.

Preferably, the device further comprises: a first rotating rod, which is arranged on side of the first gear, and is coaxial to the first gear; a second rotating rod, which is arranged on side of the third gear, and is coaxial to the third gear; and a third rotating rod, which is arranged on side of the fourth gear, and is coaxial to the fourth gear. Preferably, the collet connects the third motor through the fourth bore hole.

Preferably, an internal space formed inside the collet and allowing the collet to bridge the third motor and the focus knob, wherein the internal space is funnel-shaped with a wide end and a narrow end, the wide end of the internal space is connected to the focus knob, and the narrow end of the internal space is connected to the third motor. Preferably, the device further comprises a first rubber ring, which is arranged in the first bore hole, and is optionally connected to the first rotating part; the device further comprises a second rubber ring, which is arranged in the second bore hole, and is optionally connected to the second rotating part; and a third rubber ring, which is arranged inside the collet and is optionally connected to the focus knob.

Preferably, wherein the processor further comprises: a Raspberry PI, which is for running a program. Preferably, wherein the program's programming language comprises: a python.

The present disclosure further provides a microscope, comprises: a frame;

an objective lens, which is arranged on the frame; an eyepiece, which is arranged on the frame, and is correspondingly arranged with the objective lens; a microscope stage, which is adjustably arranged on the frame, and is correspondingly arranged with the objective lens, and the microscope stage can selectively move along an x-axis or a z-axis relative to the frame; a slide holder, which is adjustably arranged on the microscope stage, and is able to clamp a slide optionally, comprising: a first rotating part, an end of which is correspondingly arranged with the microscope stage, optionally controls movement of the microscope stage along the x-axis relative to the frame; and a second rotating part, which is coaxial to the first rotating part, and is rotatably arranged on the first rotating part, an end of the second rotating part is correspondingly arranged with the slide holder, optionally controls movement of the slide holder along the y-axis relative to the frame. a focus knob, which is arranged on the frame, and is correspondingly arranged with the microscope stage, optionally controls movement of the microscope stage along the y-axis relative to the frame; and a device for adjusting microscope in three-axis direction, comprising: a first gear set, which is matched with a first rotating part of a rotation unit of the microscope, and is configured to move the microscope stage along an x-axis direction; a second gear set, which is matched with a second rotating part of the rotation unit of the microscope, and is configured to move a slide holder along a y-axis direction; a collet, which is mounted on a focus knob, and is able to drive the focus knob rotate and move the microscope stage along a z-axis direction; and a processor, electronically connected with the first gear set, the second gear set, and the collet, and is configured to control the run of the first gear set, the second gear set and the collet optionally.

Preferably, the microscope further comprises: an image device, which is electronically connected with the processor, and is optionally mounted on the eyepiece, wherein the image device can obtain an image through the eyepiece. In one aspect, the image device comprising a resolution assessment unit for assessing a resolution value of the image. Preferably, the microscope further comprises: a storage device, which is electronically connected with the processor or the image device for saving data or images.

The present disclosure further provides a method for operating the microscope, comprises: (S1) place the slide on a reference position of the microscope stage, and use the slide holder to clamp the slide; (S2) move the microscope stage along the x-axis direction and move the slide holder along the y-axis direction by using the processor to set the slide on an initial observation location; (S3) use an image device to gain an image at a default magnification level through the eyepiece, then assess the resolution value of the image, send assessed result to the processor; (S4) use the processor to determine whether the resolution value is equal to or over threshold value? If yes, followed by (S5), if not, the processor will control the microscope stage move a first unit distance along the z-axis, and return to (S3); (S5) base on a default migration route, the processor controls the microscope stage which is holding the slide move a second unit distance along the x-axis direction, and, the processor controls the slide holder to move a third unit distance along the y-axis direction, the processor allows the slide to move from the initial observation location to a target observation location then controls the image device to gain a photo through the eyepiece; and (S6) the processor determines whether the slide has moved to the target observation location? If yes, the processor then controls the microscope stage and the slide holder holding the slide to move back to the reference position, and end the process, if not, return to (S5). In another aspect, the present disclosure further provides a method for operating the microscope, comprises: (P1) place the slide on a reference position of the microscope stage, and use the slide holder to clamp the slide; (P2) move the microscope stage along the x-axis direction and move the slide holder along the y-axis direction by using the processor to set the slide on an initial observation location; (P3) use an image device to gain an image in a default magnification factor through the eyepiece, then assess the resolution value of the image, send the assessed result to the processor; (P4) use the processor to determine whether the resolution value is equal to or over threshold value? If yes, the processor controls the image device to save the image, and enter (P5), if not, the processor controls the microscope to move a first unit distance along the z-axis direction, and return to (P3); (P5) based on a default migration route, the processor controls the microscope stage which is holding the slide to move a second unit distance along the x-axis direction, and the processor controls the slide holder to move a third unit distance along the y-axis direction, allows the slide to move from the initial observation location to a target observation location; (P6) the image device gains a photo at a default magnification level through the eyepiece, and assesses the resolution value of the image, send assessed result to the processor; (P7) the processor determines whether the resolution value of the image is equal to or over threshold value? if yes, the processor controls the image device to save the image, and enter (P8), if not, the processor controls the microscope stage to move along the z-axis direction, and return to (P6); and (P8) the processor determines whether the slide has moved to the target observation location? If yes, the processor controls the microscope stage and the slide holder to move, and allows the slide to return to the reference position, and end the procedure, if not, return to (P5).

DETAILED DESCRIPTION

Figure 1:
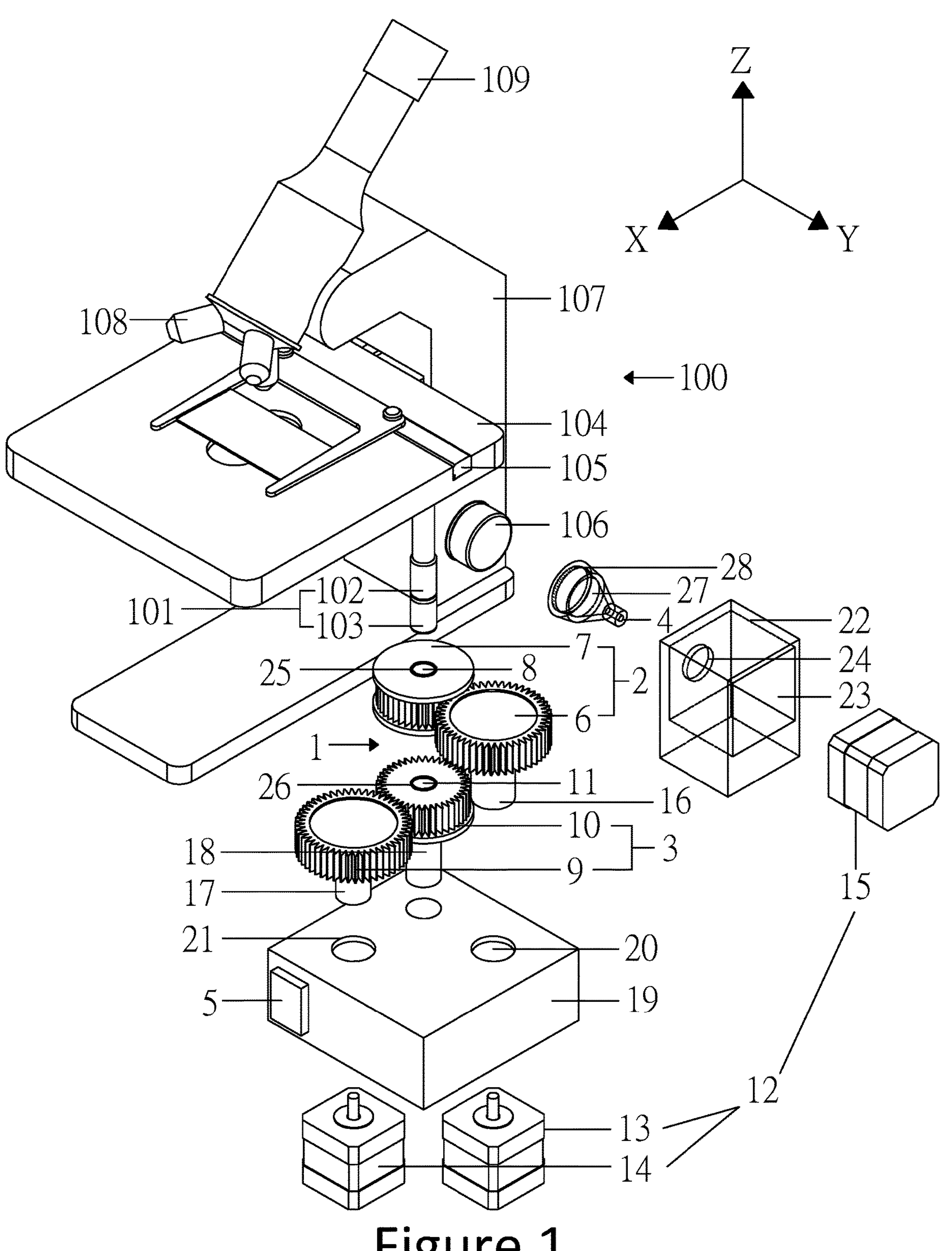
FIG. 1 illustrates an explosion diagram of the feature structure of present disclosure

To solve problems mentioned above, the present disclosure will be described in detail for understanding properly by providing some preferred embodiments:

With reference to FIG. 1, one of purpose of the present disclosure is: providing a device for adjusting microscope in three-axis direction (1), comprising: a first gear set (2), which is matched with a first rotating part (102) of a rotation unit (101) of a microscope (100), and is configured to move a microscope stage (104) along an x-axis direction; a second gear set (3), which is matched with a second rotating part (103) of the rotation unit (101) of the microscope (100), and is configured to move a slide holder (105) along a y-axis direction relative to the microscope stage (104); a collet (4), which is mounted on a focus knob (106), and is able to drive the focus knob (106) rotate and move the microscope stage (104) along a z-axis direction; and a processor (5), electronically connected with the first gear set (2), the second gear set (3), and the collet (4), and is configured to control operation of the first gear set (2), the second gear set (3) and the collet (4) optionally. In some preferred embodiments, an x-y plane is formed on side of the microscope stage (104) for placing a slide thereon, the y-axis is parallel to moving direction of the slide holder (105) relative to the microscope stage (104), the x-axis is vertical to the y-axis, the z-axis is parallel to the direction of the slide holder (105) ahead toward the microscope stage (104). In another preferred embodiments, the processor (5) comprises a Raspberry Pi, which is applied to run a program constituted of a programming language, wherein the programming language comprises a python, but not limited.

Figure 2A:
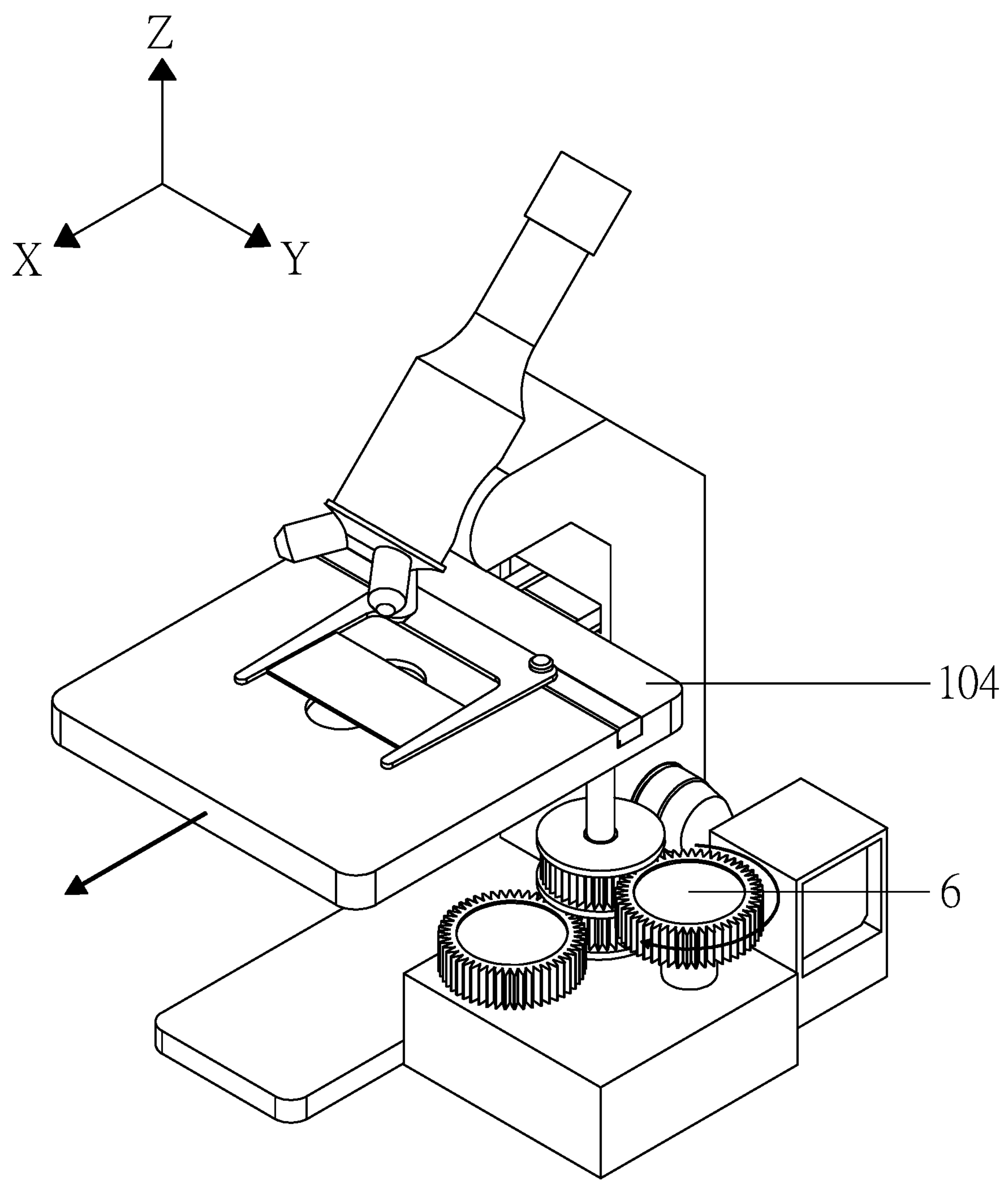
FIG. 2A-C illustrate a stereogram of method to control the microscope move along three-axis direction of present disclosure
Figure 2B:
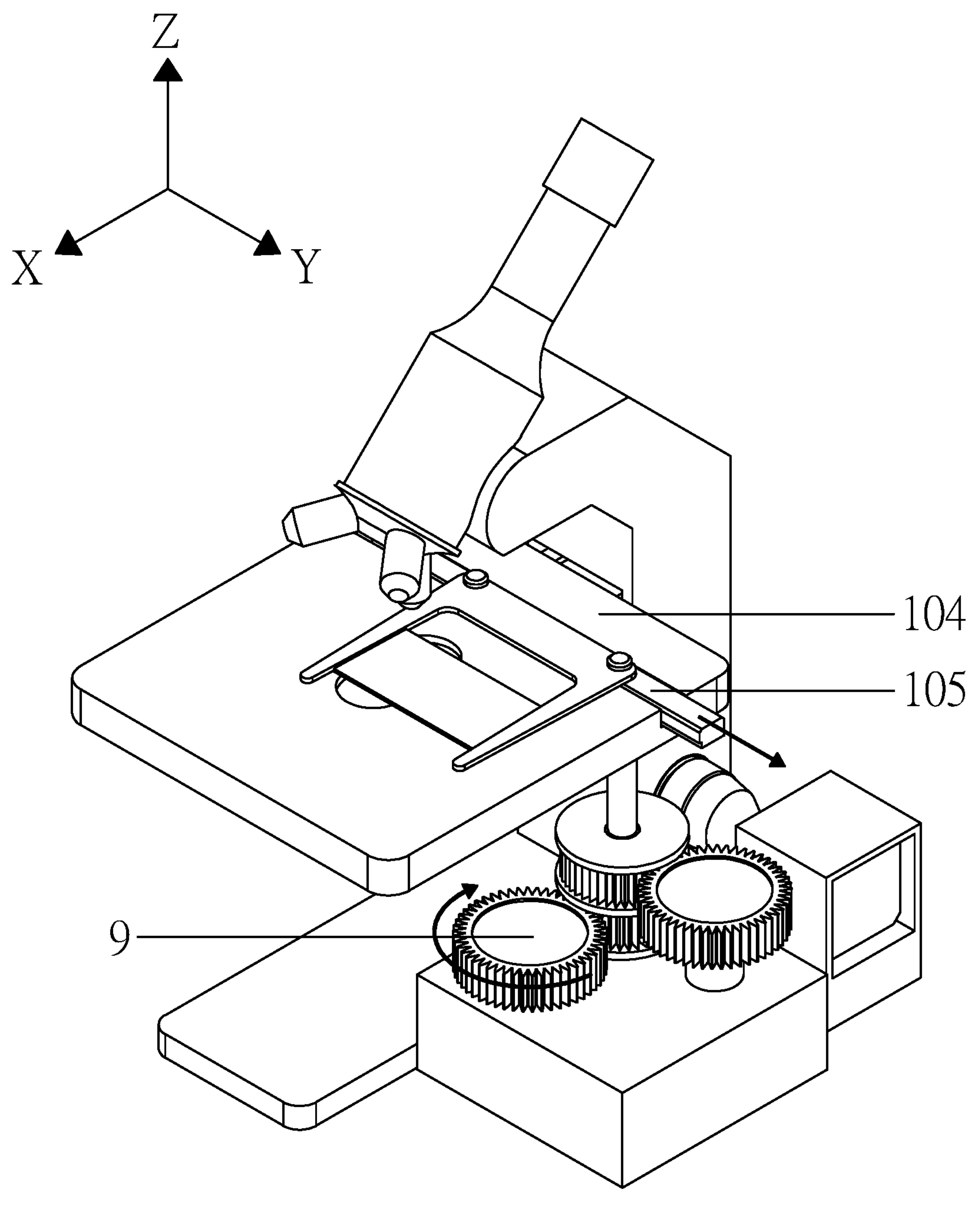
Figure 2C:
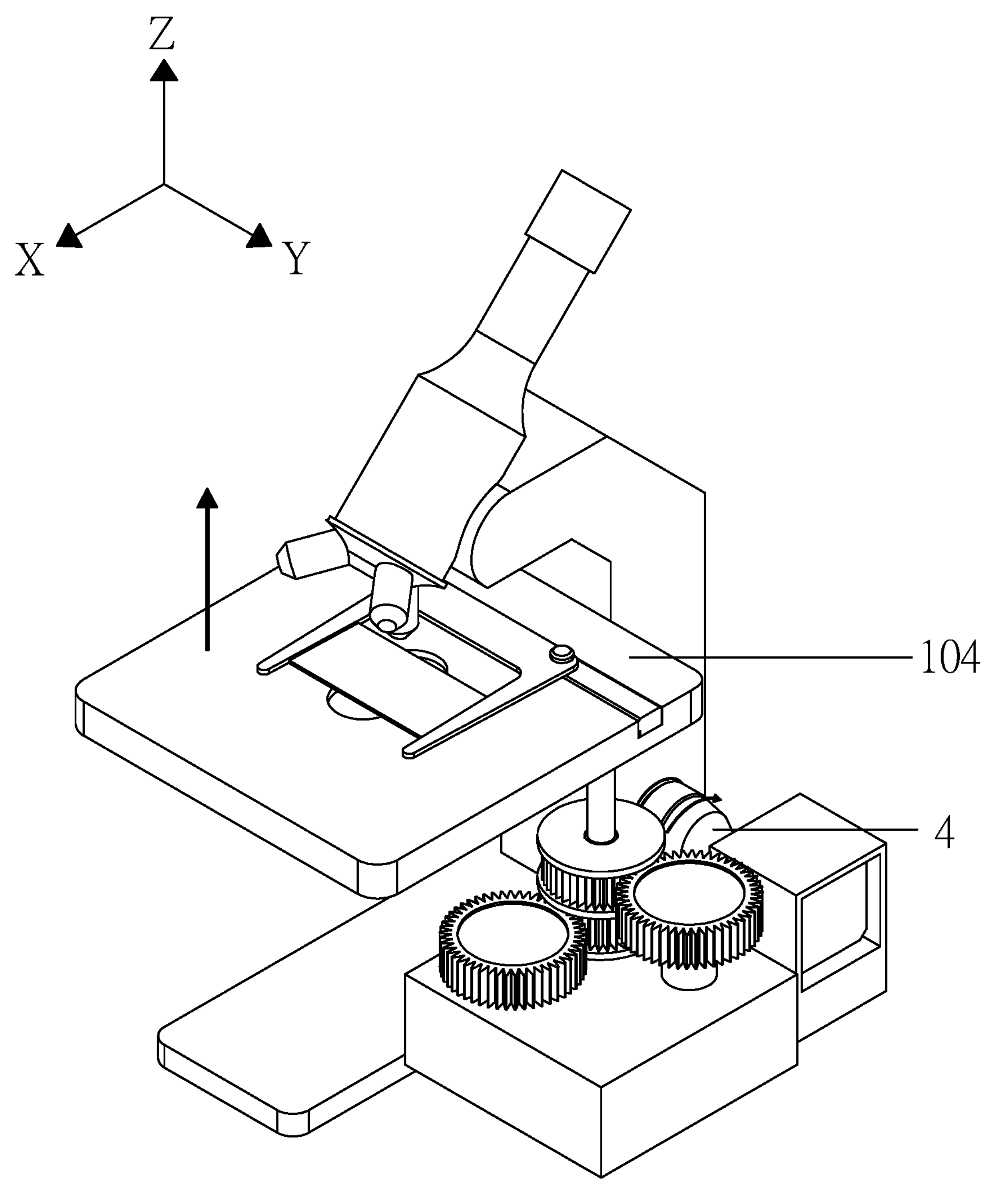

Preferably, the slide is carrying sample or microorganism waiting for examination later, and to control movement of slide precisely to continually observe or obtain the vision of object carried by the slide without interruption, wherein the first gear set (2) comprises: a first gear (6), which is rotatable; and a second gear (7), which is rotatable and is correspondingly arranged with the first gear (6); and the second gear set (3) comprises: a third gear (9), which is rotatable; and a fourth gear (10), which is rotatable and is correspondingly arranged with the third gear (9). In some embodiments, a first bore hole (8) is coaxially arranged on the second gear (7), and that allows the second gear (7) to detachably mount on the first rotating part (102); a second bore hole (11) is coaxially arranged on the fourth gear (10), and that allows the fourth gear (10) to detachably mount on the second rotating part (103); wherein when the first gear (6) rotates, the second gear (7) and the first rotating part (102) rotate cooperatively, and when the third gear (9) rotates, the fourth gear (10) and the second rotating part (103) rotate cooperatively. In some preferred embodiments, wherein the second gear (7) is coaxial to the fourth gear (10), and the second gear (7) is arranged above the fourth gear (10); Comprehensibly, in order to avoid interference being formed between the second gear (7) and the fourth gear (10) and then to maintain precise movement of the microscope stage (104) or the slide holder (105), there is further a rotating shaft arranged between the second gear (7) and the fourth gear (10). In some preferred embodiments, with reference to FIG. 2A, when the first gear (6) rotates, the microscope stage (104) moves along x-axis direction; with reference to FIG. 2B, when the third gear (9) rotates, the slide holder (105) moves along y-axis direction relative to the microscope stage (104); and with reference to FIG. 2C, when the collet (4) rotates, the microscope stage (104) moves along z-axis direction In some preferred embodiments, in order to determine the relative location between each of gears, and prevent gears from shifting during operation, wherein the device (1) further comprises: a first rotating rod (16), which is arranged on side of the first gear (6), and is coaxial to the first gear (6); a second rotating rod (17), which is arranged on side of the third gear (9), and is coaxial to the third gear (9); and a third rotating rod (18), which is arranged on side of the fourth gear (10), and is coaxial to the fourth gear (10). a first main body (19), which is comprising: a first storage space (20) arranged inside the first main body (19); and there third bore hole (21), which are separately disposed on same side of the first main body (19) and are connected to the first storage space (20); and a second main body (22), which is comprising: a second storage space (23), arranged inside the second main body (22), and a fourth bore hole (24), which is disposed on side of the second main body (22) and is connected to the second storage space (23). Preferably, in order to control the first gear set (2), the second gear set (3), and the collet (4), and subsequently to control slide to move along directions of x-axis, or y-axis, or z-axis, the device (1) further comprises: a motor set (12), which is electronically connected with the processor (5), being activated or deactivated by the processor (5) optionally, wherein the motor set (12) comprises: a first motor (13), which is correspondingly arranged with the first gear (6) for optionally driving the first gear (6) to rotate; a second motor (14), which is correspondingly arranged with the third gear (9) for optionally driving the third gear (9) to rotate; a third motor (15), which is correspondingly arranged with the collet (4) for optionally driving the collet (4) to rotate; wherein the first motor (13) and the second motor (14) are separately mounted in the first storage space (20), and the third motor (15) is mounted in the second storage space (23). It is understood that the first rotating rod (16) is arranged on the first main body (19) and connecting to the first motor (13) through one of the third bore hole (21); the second rotating rod (17) is arranged on the first main body (19) and connecting to the second motor (14) through one of the third bore hole (21); and the third rotating rod (18) is arranged on the first main body (19) through one of the third bore hole (21).

In some preferred embodiments, the collet (4) connects the third motor (15) through the fourth bore hole (24), and preferably the collet (4) further comprises: an internal space formed inside the collet (4) and allowing the collet (4) to bridge the third motor (15) and the focus knob (106), wherein the internal space is funnel-shaped with a wide end and a narrow end, the wide end of the internal space is connected to the focus knob (106), and the narrow end of the internal space is connected to the third motor (15). In another preferred embodiments, the focus knob (106) comprises a course focus knob or a fine focus knob, and the collet (4) connects to the fine focus knob.

Preferably, in order to introduce sufficient friction to enhance connection and eliminate displacement between the second gear (7) and the first rotating part (102) during rotation of the first gear (6) and the second gear (7); and in order to introduce sufficient friction to enhance the connection and eliminate displacement between the fourth gear (10) and the second rotating part (103) during rotation of the third gear (9) and the fourth gear (10), and in order to stabilize the connection between the collet (4) and the focus knob (106), then allows the collet (4) to control the focus knob (106) precisely, the device (1) further comprises: a first rubber ring (25), which is arranged in the first bore hole (8), and is optionally connected to the first rotating part (102); and a second rubber ring (26), which is arranged in the second bore hole (11), and is optionally connected to the second rotating part (103); a third rubber ring (27), which is arranged inside the collet (4) and is optionally connected to the focus knob (106) respectively.

The present disclosure further provides a microscope (100), with reference to FIG. 1, the microscope (100) comprises: a frame (107); an objective lens (108), which is arranged on the frame (107); an eyepiece (109), which is arranged on the frame (107), and is correspondingly arranged with the objective lens (108); a microscope stage (104), which is adjustably arranged on the frame (107), and is correspondingly arranged with the objective lens (108), and the microscope stage (104) can selectively move along a x-axis or a z-axis relative to the frame (107); a slide holder (105), which is adjustably arranged on the microscope stage (104), and is able to clamp a slide optionally, comprising: a first rotating part (102), an end of which is correspondingly arranged with the microscope stage (104), optionally controls movement of the microscope stage (104) along the x-axis relative to the frame (107); and a second rotating part (103), which is coaxial to the first rotating part (102), and is rotatably arranged on the first rotating part (102), an end of the second rotating part (103) is correspondingly arranged with the slide holder (105), optionally controls movement of the slide holder (105) along the y-axis relative to the frame (107); a focus knob (106), which is arranged on the frame (107), and is correspondingly arranged with the microscope stage (104), optionally controls movement of the microscope stage (104) along the y-axis relative to the frame (107); and a device for adjusting microscope in three-axis direction, comprising: a first gear set (2), which is matched with a first rotating part (102) of a rotation unit (101) of the microscope (100), and is configured to move the microscope stage (104) along an x-axis direction; a second gear set (3), which is matched with the second rotating part (103) of the rotation unit (101) of the microscope (100), and is configured to move a slide holder (105) along a y-axis direction; a collet (4), which is mounted on a focus knob (106), and is able to drive the focus knob (106) rotate and move the microscope stage (104) along a z-axis direction; and a processor (5), electronically connected with the first gear set (2), the second gear set (3), and the collet (4), and is configured to control the run of the first gear set (2), the second gear set (3) and the collet (4) optionally. Preferably, the microscope (100) further comprises an image device, which is electronically connected with the processor (5), and is optionally mounted on the eyepiece (109), wherein the image device can obtain an image through the eyepiece (109); More preferably, the image device further comprises a resolution assessment unit for assessing a resolution value of the image, and in another embodiment, the microscope further comprises a storage device, which is electronically connected with the processor or the image device for saving data or images.

Figure 3:
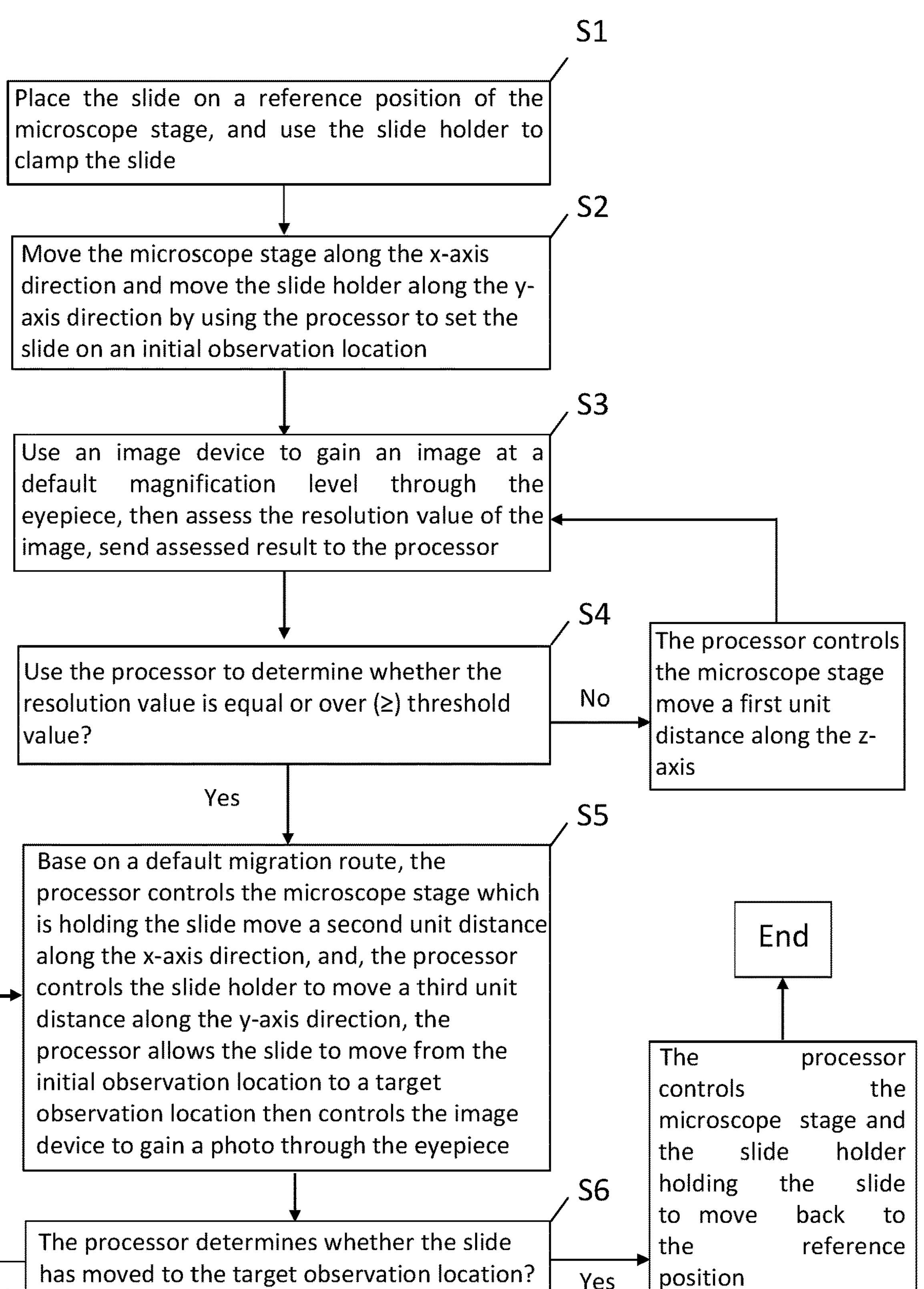
FIG. 3 illustrates a flow chart of method to control the microscope of some embodiments

The present disclosure further provides a method for operating the microscope (100), with reference to FIG. 3, the method comprises: (S1) place the slide on a reference position of the microscope stage (104), and use the slide holder (105) to clamp the slide; (S2) move the microscope stage (104) along the x-axis direction and move the slide holder (105) along the y-axis direction by using the processor (5) to set the slide on an initial observation location; (S3) use an image device to gain an image at a default magnification level through the eyepiece (109), then the resolution assessment unit of the image device will assess the resolution value of the image, send assessed result to the processor (5); (S4) use the processor (5) to determine whether the resolution value is equal to or over a threshold value? If yes, followed by (S5), if not, the processor (5) will control the microscope stage (104) move a first unit distance along the z-axis, and return to (S3); (S5) base on a default migration route, the processor (5) controls the microscope stage (104) which is holding the slide move a second unit distance along the x-axis direction, and the processor (5) controls the slide holder (105) to move a third unit distance along the y-axis direction, allows the slide to move from the initial observation location to a target observation location, and then gain a photo through the eyepiece by controlling the image device after the movement; and (S6) the processor (5) determines whether the slide has moved to the target observation location? If yes, the processor (5) then controls the microscope stage and the slide holder holding the slide to move back to the reference position, and end the process, if not, return to (S5).

Figure 4:
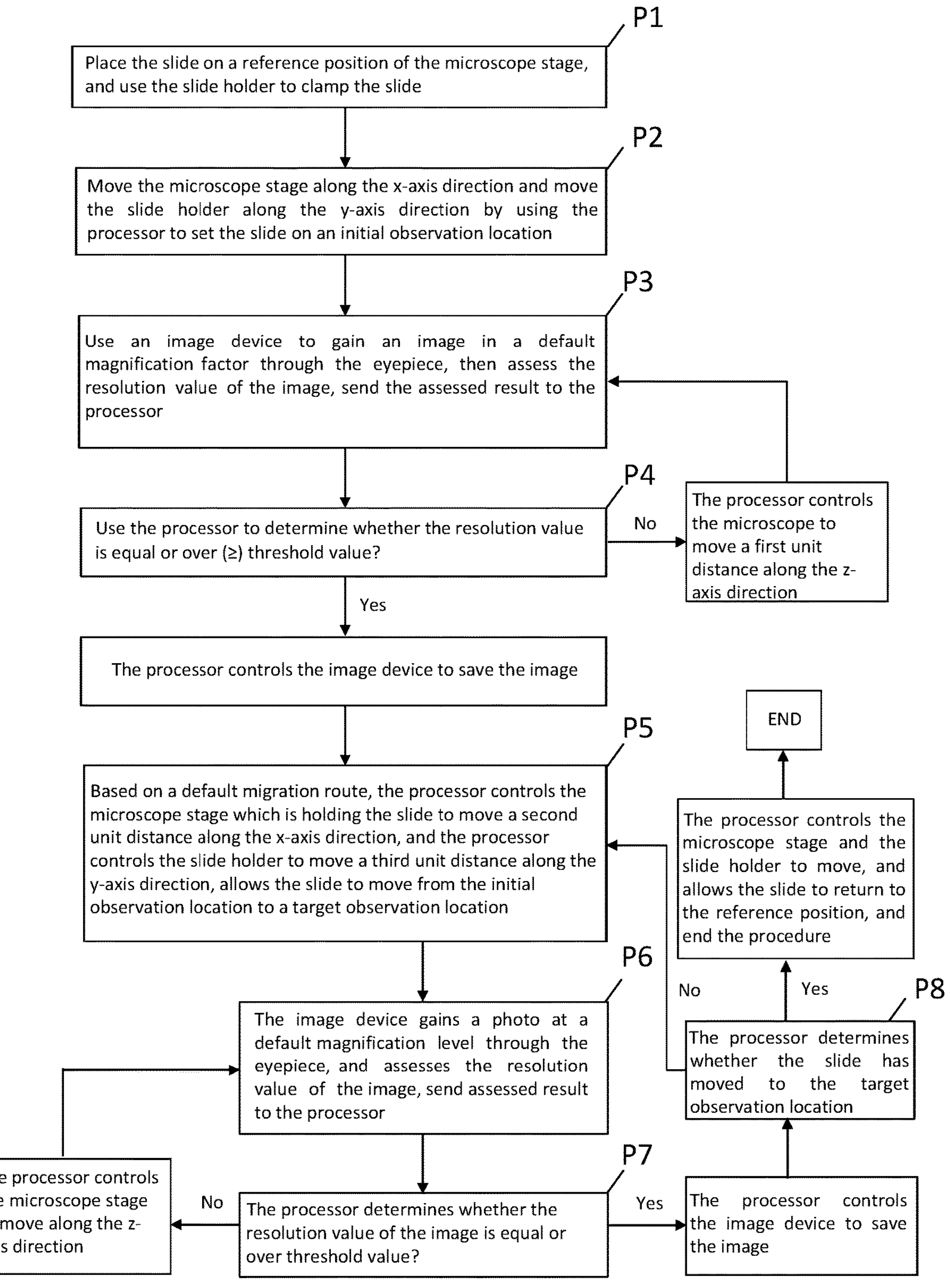
FIG. 4 illustrates another flow chart method to control the microscope of some embodiments

The present disclosure further provides a method for operating the microscope (100), with reference to FIG. 4, the method comprises: (P1) place the slide on a reference position of the microscope stage (104), and use the slide holder (105) to clamp the slide; (P2) move the microscope stage (104) along the x-axis direction and move the slide holder (105) along the y-axis direction by using the processor (5) to set the slide on an initial observation location; (P3) Use an image device to gain an image in a default magnification factor through the eyepiece (109), then assess the resolution value of the image, send the assessed result to the processor (5); (P4) use the processor (5) to determine whether the resolution value is equal to or over a threshold value? If yes, the processor (5) controls the image device to save the image, and enter (P5), if not, the processor (5) controls the microscope (104) to move a first unit distance along the z-axis direction, and return to (P3); (P5) based on a default migration route, the processor (5) controls the microscope stage (104) which is holding the slide to move a second unit distance along the x-axis direction, and the processor (5) controls the slide holder (105) to move a third unit distance along the y-axis direction, allows the slide to move from the initial observation location to a target observation location; (P6) gains a photo at a default magnification level through the eyepiece by using the image device, assesses the resolution value of the image, send assessed result to the processor (5); (P7) the processor (5) determines whether the resolution value of the image is equal to or over threshold value, if yes, the processor (5) controls the image device to save the image, and enter (P8), if not, the processor (5) controls the microscope stage (104) to move along the z-axis direction, and return to (6); and (P8) the processor (5) determines whether the slide has moved to the target observation location? If yes, the processor (5) controls the microscope stage (104) and the slide holder (105) to move, and allows the slide to return to the reference position, and end the procedure, if not, return to (P5).

The following is a detailed description of operation of microscope (100) of the present disclosure: firstly, activate processor (5) to adjust focus knob (106) and control the stage (104) to move toward a location near to the objective lens (108), wherein when the slide or sample is changed or replaced, owing to the thickness variation of each slide or sample, image resolution of each slide or sample is needed to be qualified by an image recognition method, and then if the resolution value is good enough, it means that slide or sample is located at appropriate height; then utilize the processor (5) to activate and to control the first gear set (2) and the second gear set (3) to move the microscope stage (104) and the slide thereon along a route, and continuously acquire images of the interested region of slide or sample during movement like a scanner. Specifically, define central coordinate of the microscope stage (104) as (0, 0), and define an initial coordinate of a point of slide on the microscope stage (104) as (a, b); assume that the slide is moved P unit along the a-axis direction and is moved Q unit along the y-axis direction, and assume n is a nature number, then when the point of slide moves to (a+nP, b+nQ), the image device will acquire images of the slide. Besides, the image device will acquire self-qualified images after each movement of the slide, if the image is unqualified, the processor (5) will adjust the height of microscope stage (104) until the image of the slide is qualified and is acquired by the image device, and the process is repeatable until the end.

The present disclosure is characterized by its microscope adjustment mechanism integrated with image recognition to become an automatic high-resolution microscope. Generally, when using a common optical microscope to conduct full slide scanning, the rotation unit (101) and the focus knob (106) must be controlled manually to adjust the relative height of slide or the height of microscope stage (104), then image acquisition is also manually operated. the repetitive steps of ‘adjustment’ and ‘image’ are required to complete the whole process of image record. It is also understood that it is difficult to obtain image of slide continually and precisely by manual control, there must be some mistakes or bias during the manual control process, and that may generate interrupted images. Besides, it takes hours to conduct full slide scanning, and image acquisition by manual adjustment of microscope could not guarantee qualified resolution and continuality of the image, and the efficiency of manual adjustment requires improvement. The present disclosure provides a device for adjusting microscope in three-axis direction and that can be applied on the common optical microscope. Moreover, the thickness of each slide or the thickness of a slide's surface varies, and therefore the image loses their resolution most of the time. The present disclosure allows resolution qualification of images acquired from the indicated image region of slide, and only when the resolution value reaches a threshold, the image device obtains an image of the slide. The step mentioned above guarantees that the image device is able to continually obtain an image with clarity by fully automatic process, and that can increase the efficiency of obtaining image of the slide.

This disclosure may be embodied in many different forms and should not be construed as limited to the exemplary embodiments herein. Every equivalent change based on the claims or the description of this disclosure are considered not surpassing the range of this disclosure. In addition, these exemplary embodiments and claims are not limited to uncover entire advantages of this disclosure. Moreover, the abstract and the title is only used for patent searching but not for limiting the claims of this disclosure. The terminology 'a first' or 'a second' used herein is for naming particular elements only and is not intended to be limiting of the disclosure or limiting of the quantity of elements.

What is claim is:

1. A device for adjusting microscope in three-axis direction, comprising:

a first gear set, which is matched with a first rotating part of a rotation unit of a microscope, and is configured to move a microscope stage along an x-axis direction;

a second gear set, which is matched with a second rotating part of the rotation unit of the microscope, and is configured to move a slide holder along a y-axis direction relative to the microscope stage;

a collet, which is mounted on a focus knob, and is able to drive the focus knob rotate and move the microscope stage along a z-axis direction; and a processor, electronically connected with the first gear set, the second gear set, and the collet, and is configured to control operation of the first gear set, the second gear set and the collet optionally.

2. The device as claimed in claim 1, wherein:

the first gear set comprises:

a first gear, which is rotatable; and a second gear, which is rotatable and is correspondingly arranged with the first gear; and the second gear set comprises:

a third gear, which is rotatable; and a fourth gear, which is rotatable and is correspondingly arranged with the third gear.

3. The device as claimed in claim 2, further comprises:

a first bore hole is coaxially arranged on the second gear, and that allows the second gear to detachably mount on the first rotating part;

a second bore hole is coaxially arranged on the fourth gear, and that allows the fourth gear to detachably mount on the second rotating part; wherein when the first gear rotates, the second gear and the first rotating part rotate cooperatively, and when the third gear rotates, the fourth gear and the second rotating part rotate cooperatively.

4. The device as claimed in claim 2, wherein the second gear is coaxial to the fourth gear, and the second gear is arranged above the fourth gear.

5. The device as claimed in claim 4, further comprises a rotating shaft, which is arranged between the second gear and the fourth gear.

6. The device as claimed in claim 2, further comprises:

a first main body, which is comprising:

a first storage space arranged inside the first main body; and three third bore hole, which are separately disposed on same side of the first main body and are connected to the first storage space; and a second main body, which is comprising:

a second storage space, arranged inside the second main body, and a fourth bore hole, which is disposed on side of the second main body and is connected to the second storage space.

7. The device as claimed in claim 2, further comprises a motor set, which is electronically connected with the processor, being activated or deactivated by the processor optionally, wherein the motor set comprises:

a first motor, which is correspondingly arranged with the first gear for optionally driving the first gear to rotate;

a second motor, which is correspondingly arranged with the third gear for optionally driving the third gear to rotate;

a third motor, which is correspondingly arranged with the collet for optionally driving the collet to rotate; wherein the first motor and the second motor are separately mounted in the first storage space, and the third motor is mounted in the second storage space.

8. The device as claimed in claim 2, further comprises:

a first rotating rod, which is arranged on side of the first gear, and is coaxial to the first gear;

a second rotating rod, which is arranged on side of the third gear, and is coaxial to the third gear; and a third rotating rod, which is arranged on side of the fourth gear, and is coaxial to the fourth gear.

9. The device as claimed in claim 8, wherein the first rotating rod is arranged on the first main body and is connecting to the first motor through one of the third bore hole;

the second rotating rod is arranged on the first main body and is connecting to the second motor through one of the third bore hole; and the third rotating rod is arranged on the first main body through one of the third bore hole.

10. The device as claimed in claim 7, wherein the collet connects the third motor through the fourth bore hole.

11. The device as claimed in claim 2, the collet further comprises:

an internal space formed inside the collet and allowing the collet to bridge the third motor and the focus knob, wherein the internal space is funnel-shaped with a wide end and a narrow end, the wide end of the internal space is connected to the focus knob, and the narrow end of the internal space is connected to the third motor.

12. The device as claimed in claim 2, further comprises:

a first rubber ring, which is arranged in the first bore hole, and is optionally connected to the first rotating part;

a second rubber ring, which is arranged in the second bore hole, and is optionally connected to the second rotating part; and a third rubber ring, which is arranged inside the collet and is optionally connected to the focus knob.

13. The device as claimed in claim 1, wherein the processor further comprises:

a Raspberry PI, which is for running a program.

14. The device as claimed in claim 13, wherein the program's programming language comprises:

a python.

* * * * *